(12) United States Patent
Wang et al.

(10) Patent No.: US 9,806,909 B2
(45) Date of Patent: Oct. 31, 2017

(54) DATA SWITCHING APPARATUS AND SYSTEM

(71) Applicant: Huawei Technologies Co., Ltd., Shenzhen (CN)

(72) Inventors: Yan Wang, Shenzhen (CN); Xiaoling Yang, Shenzhen (CN); Huixiao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/220,152

(22) Filed: Jul. 26, 2016

(65) Prior Publication Data

US 2016/0337147 A1    Nov. 17, 2016

Related U.S. Application Data

(63) Continuation of application No. PCT/CN2014/071591, filed on Jan. 27, 2014.

(51) Int. Cl.
| | |
|---|---|
| *H04L 12/64* | (2006.01) |
| *H04B 10/27* | (2013.01) |
| *H04Q 11/00* | (2006.01) |
| *H04Q 5/00* | (2006.01) |
| *H04Q 9/00* | (2006.01) |

(52) U.S. Cl.
CPC ......... *H04L 12/6418* (2013.01); *H04B 10/27* (2013.01); *H04Q 5/00* (2013.01); *H04Q 9/00* (2013.01); *H04Q 11/00* (2013.01)

(58) Field of Classification Search
None
See application file for complete search history.

(56) References Cited

U.S. PATENT DOCUMENTS

2016/0037240 A1 *    2/2016  Yang .................. H04Q 11/0005
                                                       398/45

FOREIGN PATENT DOCUMENTS

| CN | 1610286 A | 4/2005 |
|---|---|---|
| CN | 1717113 A | 1/2006 |
| CN | 101370312 A | 2/2009 |
| EP | 1424870 A2 | 6/2004 |

* cited by examiner

*Primary Examiner* — Darren E Wolf
(74) *Attorney, Agent, or Firm* — Leydig, Voit & Mayer, Ltd.

(57) ABSTRACT

The present invention discloses a data switching apparatus and system, where the data switching apparatus includes: an optical-to-electrical conversion unit, an identification unit, an electrical switching unit, an electrical-to-optical conversion unit, an optical switching control unit, and an optical switching unit. The optical-to-electrical conversion unit is configured to perform optical-to-electrical conversion on a first optical data packet and an optical label, where the optical label carries switching information of a second optical data packet, and the first optical data packet and the second optical data packet are respectively to-be-switched data packets that need to use electrical packet switching and optical packet switching. The identification unit is configured to identify whether an electrical signal output by the optical-to-electrical conversion unit is from the optical label or the first optical data packet.

9 Claims, 6 Drawing Sheets

DATA SWITCHING APPARATUS AND SYSTEM

CROSS-REFERENCE TO RELATED APPLICATIONS

This application is a continuation of International Patent Application No. PCT/CN2014/071591, filed Jan. 27, 2014, which is hereby incorporated by reference in its entirety.

TECHNICAL FIELD

The present invention relates to the field of data switching, and in particular, to a data switching apparatus and system.

BACKGROUND

With constant development of communications technologies and computer technologies, people have more requirements on a network service. An efficient data switching solution needs to be designed in a data switching network, to achieve higher bandwidth utilization and a lower data transmission delay.

Currently, data switching is implemented mainly by means of an electrical switching technology or an optical switching technology. The electrical switching technology is performing optical-to-electrical conversion on a received data packet to obtain an electrical signal, parsing the electrical signal, after obtaining switching information of the data packet, exchanging the data packet to a destination port, and sending an optical signal obtained by means of electrical-to-optical conversion. Because of limitations of technologies such as backplane technologies and energy consumption technologies, the electrical switching technology cannot meet requirements on a rapidly-growing data center capacity and a low delay of data transmission.

Common optical switching technologies include optical packet switching. Specific steps are: for a signal entering an optical switching node, sending, by using a demultiplexing apparatus, an optical label carrying switching information to a switching control unit; performing, by the switching control unit, optical-to-electrical conversion on the optical label, to extract and generate a control signal; and controlling, according to the generated control signal, an optical switching unit to establish an optical link, so as to implement switching on an optical packet. The optical packet switching does not perform optical-to-electrical conversion or parse the entire data packet, thereby obviously reducing a processing delay and energy consumption, and obviously increasing a switching capacity. However, limited by a scale of an optical switch and a switching time of the switch, not switching on all data packets can be completed by an optical packet switching apparatus.

SUMMARY

Technical Problem

In view of this, a technical problem that needs to be resolved in the present invention is how to implement efficient and rapid data switching in a data switching network.

Solution to Problem

To resolve the foregoing technical problem, according to an embodiment of the present invention, a data switching apparatus is provided, including: an optical-to-electrical conversion unit, configured to perform optical-to-electrical conversion on a first optical data packet and an optical label, where the first optical data packet is a to-be-switched data packet that needs to use electrical packet switching, the optical label carries switching information of a second optical data packet, and the second optical data packet is a to-be-switched data packet that needs to use optical packet switching; an identification unit, connected to the optical-to-electrical conversion unit, configured to identify whether an electrical signal output by the optical-to-electrical conversion unit is from the optical label or the first optical data packet; an electrical switching unit, connected to the identification unit, configured to switch an electrical signal that is output by the identification unit and that is from the first optical data packet; an electrical-to-optical conversion unit, connected to the electrical switching unit, configured to perform electrical-to-optical conversion on an electrical signal output by the electrical switching unit; an optical switching control unit, connected to the identification unit, configured to generate a control signal according to an electrical signal that is output by the identification unit and that is from the optical label; and an optical switching unit, connected to the optical switching control unit, configured to output the second optical data packet according to the control signal through an optical link.

In a possible implementation manner, the data switching apparatus further includes a multiplexing unit, where the multiplexing unit, connected to the electrical-to-optical conversion unit and the optical switching unit, is configured to multiplex data packets that are output by the electrical-to-optical conversion unit and the optical switching unit to a same destination port, into one signal.

In a possible implementation manner, the data switching apparatus further includes: a cache unit, connected to the electrical switching unit and the electrical-to-optical conversion unit, configured to store the electrical signal output by the electrical switching unit; and a sending control unit, connected to the cache unit and the optical switching control unit, configured to: generate a sending control signal according to switching information of the first optical data packet and the switching information of the second optical data packet, and control the cache unit and the optical switching control unit according to the sending control signal.

In a possible implementation manner, the data switching apparatus further includes a demultiplexing unit, where the demultiplexing unit, connected to the optical-to-electrical conversion unit and the optical switching unit, is configured to: separate light of a first wavelength and light of a second wavelength from a received optical signal, output the light of the first wavelength to the optical-to-electrical conversion unit, and output the light of the second wavelength to the optical switching unit, where the first optical data packet and the optical label are modulated on the light of the first wavelength, and the second optical data packet is modulated on the light of the second wavelength.

To resolve the foregoing technical problem, according to another embodiment of the present invention, a data switching system is provided, including a first processing apparatus, configured to: determine, according to a predetermined rule, whether a switching manner of a to-be-switched data packet is electrical packet switching or optical packet switching, and generate an optical label for a second optical data packet, where the second optical data packet is a to-be-switched data packet determined to use optical packet switching; and the data switching apparatus according to Embodiment 1 to Embodiment 3 of the present invention, connected to the first processing apparatus, configured to: perform electrical packet switching on a first optical data packet received from the first processing apparatus, and perform optical packet switching on the second optical data packet received from the first processing apparatus, where the first optical data packet is a to-be-switched data packet determined to use electrical packet switching.

For the data switching system, in a possible implementation manner, the first processing apparatus is further configured to: modulate the optical label and the first optical data packet on light of a first wavelength, and modulate the second optical data packet on light of a second wavelength; and the data switching apparatus further includes a demultiplexing unit, where the demultiplexing unit connected to an optical-to-electrical conversion unit and an optical switching unit, is configured to: separate the light of the first wavelength and the light of the second wavelength from a received optical signal, output the light of the first wavelength to the optical-to-electrical conversion unit, and output the light of the second wavelength to the optical switching unit.

For the data switching system, in a possible implementation manner, the first processing apparatus is further configured to perform protocol conversion on the second optical data packet into a particular frame format, so that the second optical data packet can be switched by the optical switching unit of the data switching apparatus.

In a possible implementation manner, the data switching system further includes a second processing apparatus, where the second processing apparatus, connected to the data switching apparatus, is configured to perform protocol conversion on data packets that are output by an electrical-to-optical conversion unit and the optical switching unit into a particular frame format, so that the data packets can be identified by a network device.

For the data switching system, in a possible implementation manner, the predetermined rule includes: whether a length of the to-be-switched data packet exceeds a predetermined threshold, and whether a priority of the to-be-switched data packet exceeds a predetermined level.

Advantageous Effect

First, whether a switching manner of a to-be-switched data packet is electrical packet switching or optical packet switching is determined, and then the to-be-switched data packet is switched to a destination port according to the determined switching manner. The data packet switching apparatus and system according to the embodiments of the present invention can make full use of respective advantages of an optical switching technology and an electrical switching technology, so as to implement efficient and rapid data switching in a data switching network. In addition, optical-to-electrical conversion needed by electrical packet switching and optical-to-electrical conversion needed by optical packet switching to extract switching information of a data packet are completed by a same optical-to-electrical conversion device, thereby saving an optical-to-electrical conversion device.

According to the following detailed descriptions of exemplary embodiments with reference to accompanying drawings, other features and aspects of the present invention become clear.

BRIEF DESCRIPTION OF DRAWINGS

Accompanying drawings included in the specification and constructing a part of the specification jointly show the exemplary embodiments, characteristics and aspects of the present invention, and are intended to explain the principles of the present invention.

DESCRIPTION OF EMBODIMENTS

As described in the background, a technical problem that the present invention intends to resolve is mainly how to implement efficient and rapid data switching in a data switching network. To resolve the technical problem, as described in the summary, the inventor creatively thinks of effectively combining optical packet switching with conventional electrical switching, and completing, by using a same optical-to-electrical conversion device, optical-to-electrical conversion needed by the electrical switching and optical-to-electrical conversion needed by the optical packet switching to extract switching information of a data packet. Respective advantages of an optical switching technology and an electrical switching technology are fully used, to implement efficient and rapid data switching in a data switching network, and also save an optical-to-electrical conversion device.

Specifically, first, whether a switching manner of a to-be-switched data packet is electrical packet switching or optical packet switching is determined according to a predetermined rule by a first processing apparatus. Then, the data switching apparatus switches the to-be-switched data packet to a destination port by using the switching manner determined by the first processing apparatus.

A specific process of performing data switching by using the data switching apparatus and system in the embodiments of the present invention may be: parsing and identifying, by the first processing apparatus, a standard Ethernet signal, that is, the to-be-switched data packet, determining the switching manner, generating an optical label for a second optical data packet, where the second optical data packet is a to-be-switched data packet using optical packet switching, and then outputting the generated optical label and the to-be-switched data packet to the data switching apparatus. A signal including the second optical data packet is output to the optical switching unit and a signal including a first optical data packet and the optical label is output to a same optical-to-electrical conversion unit, so that optical-to-electrical conversion is completed. The first optical data packet is a data packet using electrical packet switching; then outputting, by using an electrical switching unit, the first optical data packet converted into an electrical signal to a destination port of the first optical data packet, and converting, in an optical switching control unit, switching information of the second optical data packet that is converted into an electrical signal and that is carried in the optical label, into a control signal, so that an optical switching unit outputs the second optical data packet to a destination port of the second optical data packet according to the control signal; and processing, by a second processing apparatus, the data packet that is output to the destination port, so as to restore the data packet to a standard Ethernet signal.

The following will describe various exemplary embodiments, features and aspects of the present invention in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

In addition, for better illustration of the present invention, various specific details are given in the following specific implementation manner. A person of ordinary skill in the art should understand that the present invention may also be implemented without the specific details. In some other embodiments, methods, means, components, and circuits well known by a person skilled in the art are not described in detail, so that a main purpose of the present invention is highlighted.

Embodiment 1

Figure 1:
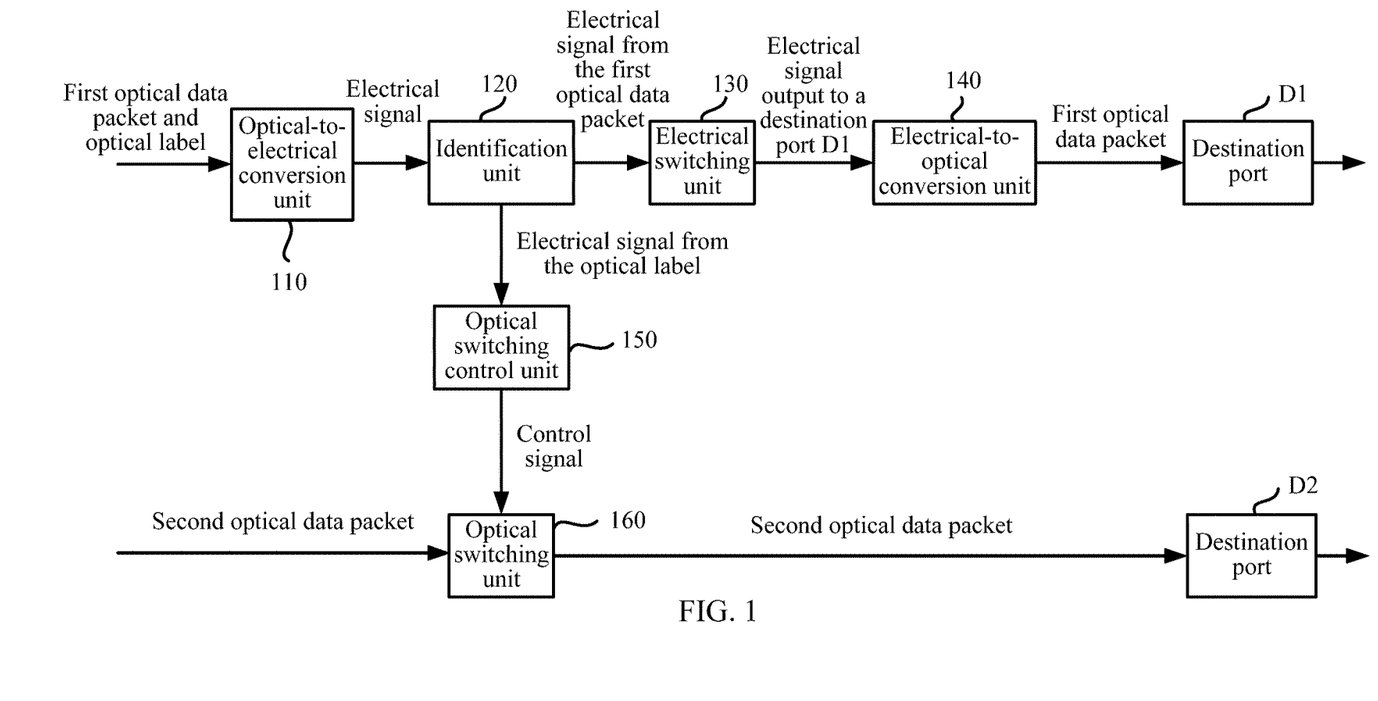
FIG. 1 is a structural block diagram of a data switching apparatus according to an embodiment of the present invention.

FIG. 1 is a structural block diagram of a data switching apparatus according to an embodiment of the present invention. As shown in FIG. 1, the data switching apparatus mainly includes: an optical-to-electrical conversion unit 110, an identification unit 120, an electrical switching unit 130, an electrical-to-optical conversion unit 140, an optical switching control unit 150, and an optical switching unit 160.

The optical-to-electrical conversion unit 110 is configured to perform optical-to-electrical conversion on a first optical data packet and an optical label, where the first optical data packet is a to-be-switched data packet that needs to use electrical packet switching, the optical label carries switching information of a second optical data packet, and the second optical data packet is a to-be-switched data packet that needs to use optical packet switching. The identification unit 120, connected to the optical-to-electrical conversion unit 110, is configured to identify whether an electrical signal output by the optical-to-electrical conversion unit is from the optical label or the first optical data packet. The electrical switching unit 130, connected to the identification unit 120, is configured to switch an electrical signal that is output by the identification unit 120 and that is from the first optical data packet. The electrical-to-optical conversion unit 140, connected to the electrical switching unit 130, is configured to perform electrical-to-optical conversion on an electrical signal output by the electrical switching unit. The optical switching control unit 150, connected to the identification unit 120, is configured to generate a control signal according to an electrical signal that is output by the identification unit 120 and that is from the optical label. The optical switching unit 160, connected to the optical switching control unit 150, is configured to output the second optical data packet according to the control signal through an optical link.

In this way, advantages of an electrical packet switching technology and an optical packet switching technology can be fully used, and the to-be-switched data packet is rapidly switched to a destination port. In addition, optical-to-electrical conversion needed by electrical packet switching and optical-to-electrical conversion needed by optical packet switching to extract switching information of a data packet are completed by using a same optical-to-electrical conversion unit, thereby saving an optical-to-electrical conversion device.

In a possible implementation manner, a switching manner of the to-be-switched data packet may be determined according to whether a length of the to-be-switched data packet exceeds a predetermined threshold or whether a priority of the to-be-switched data packet exceeds a predetermined level. For example, optical packet switching is performed on a to-be-switched data packet whose length is greater than the predetermined threshold, electrical packet switching is performed on a to-be-switched data packet whose length is less than the predetermined threshold, optical packet switching is performed on a data packet whose priority is greater than the predetermined level, and electrical packet switching is performed on a data packet whose priority is less than the predetermined level. In this way, the to-be-switched data packet may be ensured to be efficiently and rapidly switched to the destination port.

Figure 2:
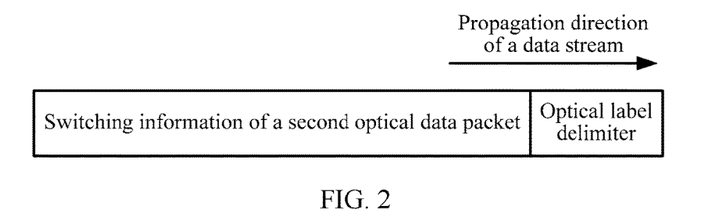
FIG. 2 is a schematic diagram of a format of an optical label according to an embodiment of the present invention.

FIG. 2 shows a possible format and content of the optical label. As shown in FIG. 2, the optical label may include two parts: an optical label delimiter and the switching information of the second optical data packet, where the optical label delimiter is used to identify beginning of the optical label, and the switching information of the second optical data packet may include information such as a destination port, a length, and a priority that are of the second optical data packet that corresponds to the optical label, and is used to generate a control signal establishing an optical switching path in the optical switching unit 160.

Optical-to-electrical conversion is performed on the first optical data packet and the optical label by using a same optical-to-electrical conversion unit 110. Therefore, the identification unit 120 needs to separate the electrical signal output by the optical-to-electrical conversion unit 110, outputs the first optical data packet on which optical-to-electrical conversion is performed to obtain the electrical signal, to the electrical switching unit 130, and outputs the optical label on which optical-to-electrical conversion is performed to obtain the electrical signal, to the optical switching control unit 150.

Figure 3:
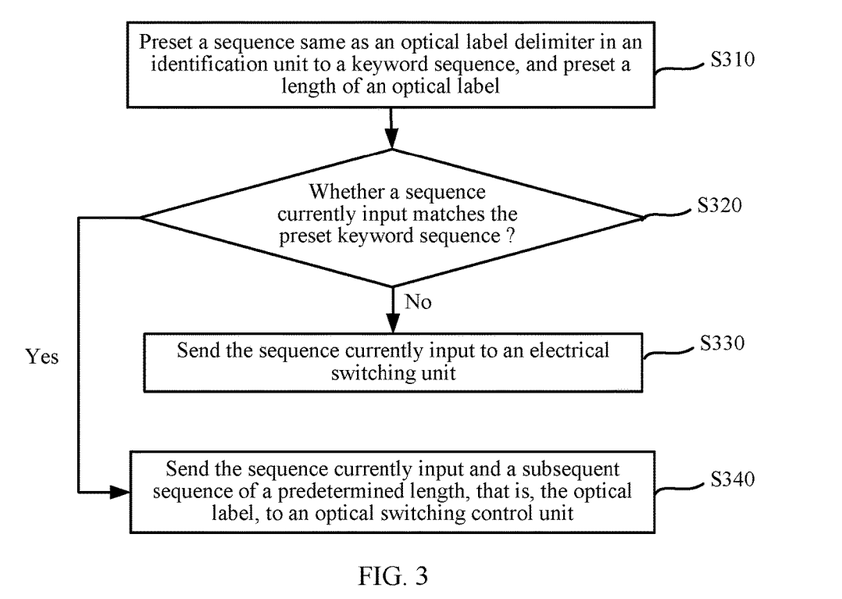
FIG. 3 is an exemplary flowchart of identifying a first optical data packet and an optical label by an identification unit in a data switching apparatus shown in FIG. 1.

In a possible implementation manner, a processing flowchart of the identification unit 120 is shown in FIG. 3, which may specifically include:

Step S310: Preset a keyword sequence and a length of the optical label in the identification unit 120, where the keyword sequence is the same as the optical label delimiter.

Step S320: Determine whether a currently input sequence matches the preset keyword sequence.

Step S330: If the currently input sequence does not match the preset keyword sequence, consider that the currently input sequence is a part of the first optical data packet, and send the currently input sequence to the electrical switching unit 130.

Step S340: If the currently input sequence matches the preset keyword sequence, consider that the currently input sequence is the optical label delimiter, and send the optical label delimiter and a subsequent sequence of a predetermined length, that is, the optical label, to the optical switching control unit 150, where the predetermined length is a length of the optical label preset in the identification unit 120.

In a possible implementation manner, the electrical switching unit 130 may be a standard Ethernet switching chip. The electrical switching unit 130 parses an electrical signal that is output by the identification unit 120 and that is from the first optical data packet, and outputs the first optical data packet to a destination port D1 of the first optical data packet according to a destination address, such as a destination MAC address or a destination IP address, carried in the first optical data packet.

The optical switching control unit 150 extracts, according to the received electrical signal from the optical label, the switching information of the second optical data packet corresponding to the optical label, generates a corresponding control signal, and outputs the control signal to the optical switching unit 160, where the control signal may control the optical switching unit 160 to implement switching on the second optical data packet. Specifically, the optical switching unit 160 adjusts a state of each switching unit according to the control signal, so as to establish a corresponding optical link according to the destination port of the second optical data packet, so that the second optical data packet may be output to the destination port D2 of the second optical data packet.

In this embodiment, if a destination port D1 of the first optical data packet is the same as the destination port D2 of the second optical data packet, the first optical data packet and the second optical data packet are transmitted in different optical fibers, and correspondingly, different physical ports need to be set in a subsequent processing apparatus.

Embodiment 2

Figure 4:
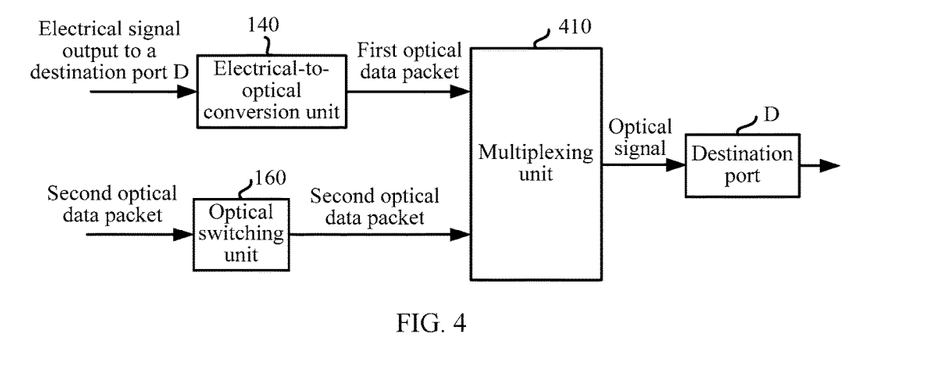
FIG. 4 is an exemplary structural block diagram of a part of components of a data switching apparatus according to an embodiment of the present invention.

A difference between a data switching apparatus in this embodiment and that in Embodiment 1 is that, as shown in FIG. 4, in a possible implementation manner, the data switching apparatus may further include a multiplexing unit 410. The multiplexing unit 410, connected to an electrical-to-optical conversion unit 140 and an optical switching unit 160, is configured to multiplex data packets that are output by the electrical-to-optical conversion unit 140 and the optical switching unit 160 to a same destination port, into one signal.

In this way, the data packets output by the electrical-to-optical conversion unit 140 and the optical switching unit 160 to the same destination port D are multiplexed into one optical signal by the multiplexing unit 410, and then the optical signal is transmitted by using a same optical fiber and passes through a same physical port, to enter a subsequent processing apparatus.

Figure 5:
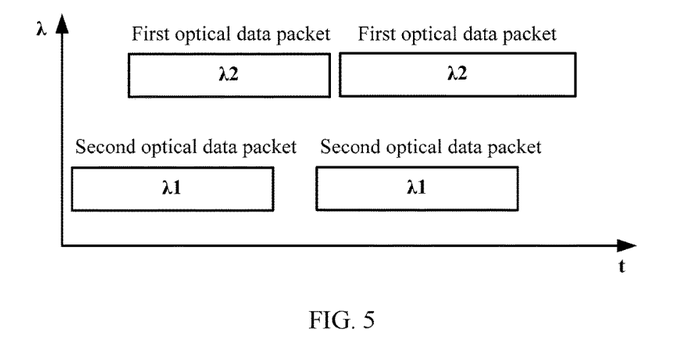
FIG. 5 is a schematic diagram of a data stream obtained after wavelength division multiplexing is performed by using a multiplexing unit shown in FIG. 4.

In a possible implementation manner, the multiplexing unit 410 shown in FIG. 4 may be a 3-dB coupler. FIG. 5 is a schematic diagram of a data stream obtained after multiplexing is performed by the multiplexing unit 410. A first optical data packet is modulated, by the electrical-to-optical conversion unit 140, on light of a wavelength $\lambda 2$ that is different from a wavelength $\lambda 1$ of light on which a second optical data packet is. The first optical data packet and the second optical data packet are on the light of different wavelengths, and do not interfere with each other during transmission. Therefore, the first optical data packet and the second optical data packet may be transmitted in a same optical fiber at the same time.

Other components of the data switching apparatus in this embodiment are the same as those described in Embodiment 1. Details are not described herein again. In this way, a wavelength division multiplexing manner is used for data packets switched to the same destination port. That is, the first optical data packet and the second optical data packet that are output by the electrical-to-optical conversion unit and the optical switching unit to the same destination port are modulated on light of different wavelengths, then are transmitted by using a same optical fiber, and are received by a same physical port of a subsequent processing apparatus, thereby reducing a quantity of ports of the subsequent processing apparatus.

Embodiment 3

Figure 6:
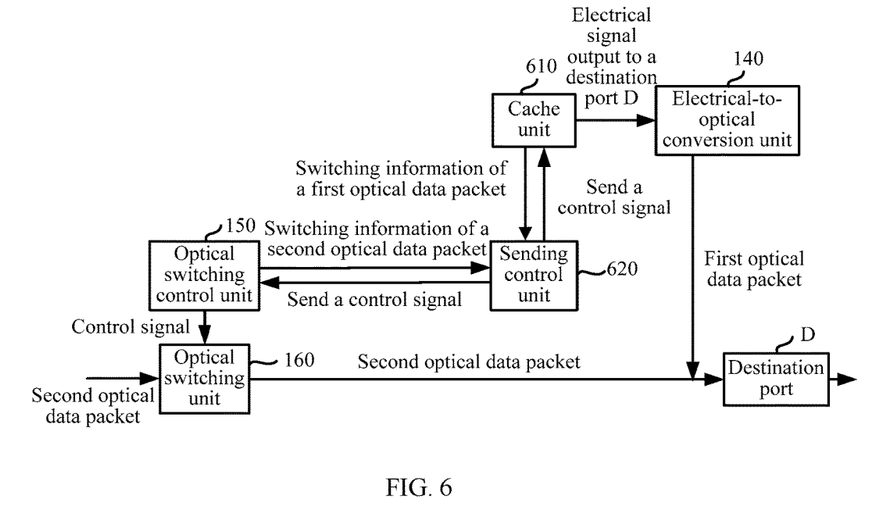
FIG. 6 is an exemplary structural block diagram of another part of components of a data switching apparatus according to an embodiment of the present invention.

A difference between a data switching apparatus in this embodiment and that in Embodiment 1 is that, as shown in FIG. 6, in a possible implementation manner, the data switching apparatus may further include a cache unit 610 and a sending control unit 620. The cache unit 610, connected to an electrical switching unit 130 and an electrical-to-optical conversion unit 140, is configured to store an electrical signal output by the electrical switching unit 130. The sending control unit 620, connected to the cache unit 610 and an optical switching control unit 150, is configured to: generate a sending control signal according to switching information of a first optical data packet and switching information of a second optical data packet, and control the cache unit 610 and the optical switching control unit 150 according to the sending control signal.

The sending control unit 620 generates the sending control signal according to the switching information of the second optical data packet output by the optical switching control unit 150 and the switching information of the first optical data packet output by the cache unit 810, and controls output of the cache unit 610 to the electrical-to-optical conversion unit 140 and control by the optical switching control unit 150 over an optical switching unit 160 according to the sending control signal, so that the electrical-to-optical conversion unit 140 and the optical switching unit 160 perform output to a destination port D at different times, where the switching information includes information such as a destination port, a length, and a priority that are of a to-be-switched data packet.

Specifically, an identification unit 120 outputs the first optical data packet converted into an electrical signal to the electrical switching unit 130. After outputting the first optical data packet to a transmit port connected to a destination port of the electrical switching unit 130, the electrical switching unit 130 does not output the first optical data packet to the electrical-to-optical conversion unit 140 to perform electrical-to-optical conversion, but outputs the first optical data packet to the cache unit 610 connected to the electrical-to-optical conversion unit 140. Destination ports corresponding to data packets stored in the cache unit 610 are the same. The sending control unit 620 controls sending moments of the data packets.

On one hand, the optical switching control unit 150 sends a control signal according to switching information carried in a received optical label, and controls the optical switching unit 160 to establish a link, so as to implement switching for the second optical data packet corresponding to the optical label in the optical switching unit 160. On the other hand, a state of each link in the optical switching unit 160 is mastered by integrating optical label information of each link in the optical switching unit 160, and the switching information of the second optical data packet corresponding to the optical label is output to the sending control unit 620.

Figure 7:
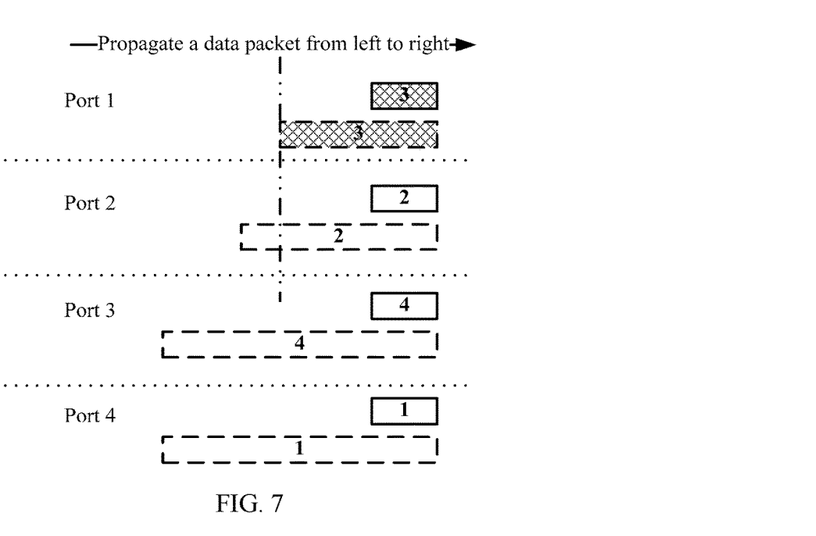
FIG. 7 is a schematic diagram of a principle of mastering a state of a link in an optical switching unit by an optical switching control unit shown in FIG. 6 by using an optical label.

FIG. 7 is a schematic diagram of a principle of mastering a state of each link in an optical switching unit 160 by an optical switching control unit 150 by using an optical label. As shown in FIG. 7, a dashed-line box represents a second optical data packet output to the optical switching unit 160, a solid-line box represents an optical label corresponding to the second optical data packet, and numbers on the second optical data packet and the optical label represent numbers of destination ports. The optical switching control unit 150 may master a situation of occupation on an output port of the optical switching unit 160, that is, a destination port of a data packet, according to an arrival moment of the optical label and the carried switching information of the second optical data packet. For example, in FIG. 7, a dashed line in a vertical direction represents a moment at which the data packet stops occupying a destination port No. 3. That is, the destination port No. 3 is idle at this moment.

A mutual negotiation process of the sending control unit 620 and the optical switching control unit 150 may include the following two aspects:

According to a first aspect, the sending control unit 620 and the optical switching control unit 150 negotiate with each other, to determine a moment at which the first optical data packet stored in the cache unit 610 is sent to an optical-to-electrical conversion unit 140. The optical switching control unit 150 sends switching information of the to-be-switched data packet in the optical switching unit 160 to the sending control unit 620, so that the sending control unit 620 can send a sending control signal to the cache unit 610 at a moment at which a destination port D is idle, and an electrical signal corresponding to the destination port D in the cache unit 610 is output to the optical-to-electrical conversion unit 140. In addition, the cache unit 610 sends the switching information of the first optical data packet in the cache unit 610 to the sending control unit 620, so that the sending control unit 620 can determine the moment at which the destination port is idle.

According to a second aspect, the sending control unit 620 negotiates with the optical switching control unit 150, and conflict-free multiplexing between the first optical data packet and the second optical data packet is implemented by controlling an optical switching state. If the destination port D is occupied by the first optical data packet output by the cache unit 610, and the second optical data packet in the optical switching unit 160 is requested to be output to the destination port D, the optical switching control unit 150 may control the optical switching unit 160 to first output the second optical data packet to a currently idle port. After a delay of an optical fiber delay line or of electrical caching, the sending control unit 620 sends the sending control signal when the destination port D is idle, so that the optical switching control unit 150 controls the optical switching unit 160 to output the second optical data packet to the destination port D.

Figure 8:
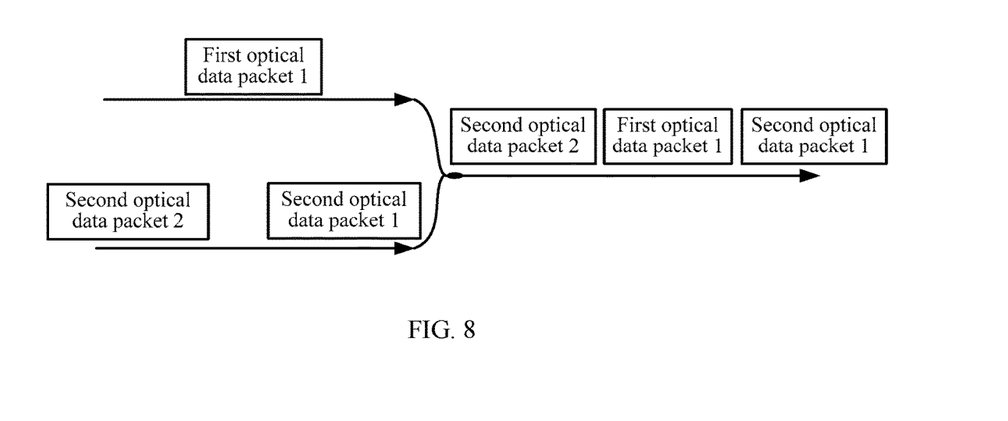
FIG. 8 is a schematic diagram of a data stream obtained after time division multiplexing is performed by using an optical switching control unit and a cache unit that are shown in FIG. 6.

FIG. 8 shows a situation of a data stream obtained before and after time division multiplexing is performed on the first optical data packet and the second optical data packet that are output to the same destination port D. As can be seen, the output first optical data packet can be inserted between second optical data packets of a same destination port without conflicts by means of mutual negotiation between the cache unit, the sending control unit, and the optical switching control unit.

Other components of the data switching apparatus in this embodiment are the same as those described in Embodiment 1. Details are not described herein again. In the data switching apparatus in this embodiment of the present invention, time division multiplexing is performed on the first optical data packet and the second optical data packet that are output to the same destination port, so that the first optical data packet and the second optical data packet can occupy a same link together without conflicts. Therefore, data packets after switching can be transmitted in a same optical fiber, and enter a subsequent processing apparatus through a same physical port, thereby reducing a quantity of physical ports.

Embodiment 4

Figure 9:
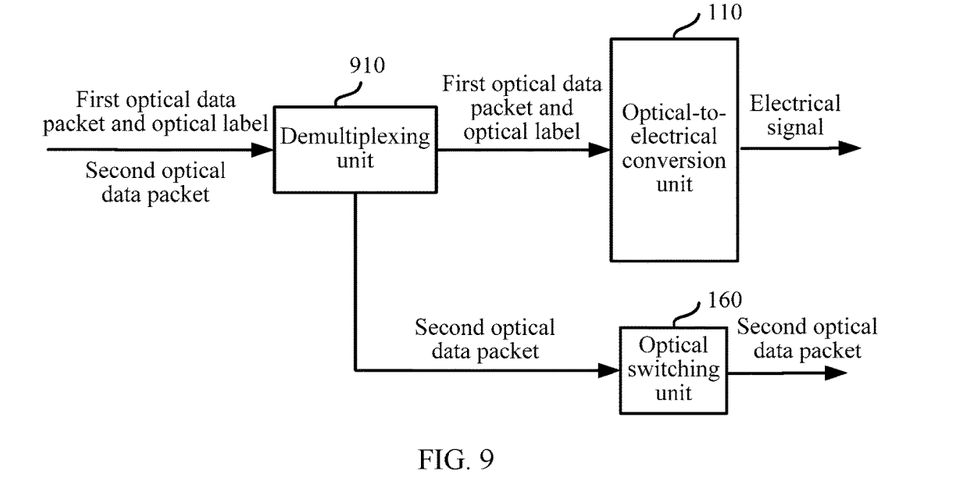
FIG. 9 is an exemplary structural block diagram of another part of components of a data switching apparatus according to an embodiment of the present invention.

A difference between a data switching apparatus in this embodiment and that in the foregoing embodiment is that, as shown in FIG. 9, in a possible implementation manner, the data processing apparatus further includes a demultiplexing unit 910. The demultiplexing unit 910, connected to an optical-to-electrical conversion unit 110 and an optical switching unit 160, is configured to: separate light of a first wavelength and light of a second wavelength from a received optical signal, output the light of the first wavelength to the optical-to-electrical conversion unit 110, and output the light of the second wavelength to the optical switching unit 160, where a first optical data packet and an optical label are modulated on the light of the first wavelength, and a second optical data packet is modulated on the light of the second wavelength.

Specifically, the first optical data packet and the optical label are modulated on light whose wavelength is $\lambda 2$, and the second optical data packet is modulated on light whose wavelength is $\lambda 1$. Optical signals modulated on light of different wavelengths do not interfere with each other. Therefore, the optical signals can be transmitted in an optical fiber at the same time, and are separated by the demultiplexing unit 910 before optical switching and optical-to-electrical conversion are performed.

In a possible implementation manner, the demultiplexing unit 910 may be a filter. Light obtained after demultiplexing is performed by the demultiplexing unit 910 is separated into two paths. The light whose wavelength is $\lambda 1$, that is, the second optical data packet, enters the optical switching unit 160 to perform optical switching; and only the light whose wavelength is $\lambda 2$, that is, the first optical data packet and the optical label, enters the optical-to-electrical conversion unit 110 to perform optical-to-electrical conversion, thereby avoiding unnecessary optical-to-electrical conversion.

It should be noted that although the foregoing embodiments are used as an example to describe the data switching apparatus shown above, a person skilled in the art can understand that the present invention should be not limited thereto. In fact, a user can completely flexibly set a combination of the demultiplexing unit, the multiplexing unit, the cache unit, and the sending control unit according to a personal preference and/or an actual application scenario.

For example, in a possible implementation manner, the data switching apparatus in this embodiment of the present invention may further include a multiplexing unit, where the multiplexing unit in this embodiment may be the same as the multiplexing unit 410 in Embodiment 2 in structure and function, and can achieve a same advantageous effect.

For another example, in a possible implementation manner, the data switching apparatus in this embodiment of the present invention may further include a cache unit and a sending control unit, where the cache unit and the sending control unit in this embodiment may be the same as the cache unit 610 and the sending control unit 620 in Embodiment 3 in structure and function, and can achieve a same advantageous effect.

Embodiment 5

Figure 10:
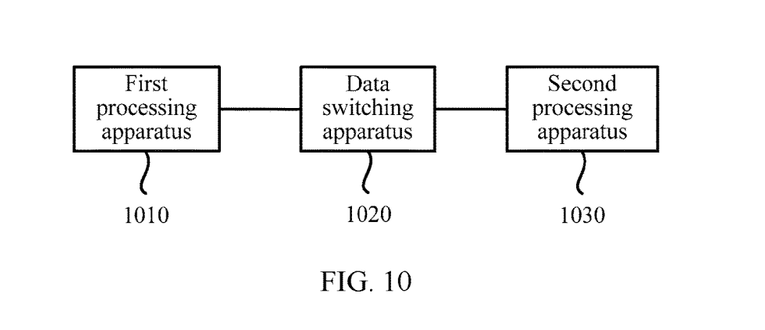
FIG. 10 is a structural block diagram of a data switching system according to an embodiment of the present invention.

FIG. 10 is a structural block diagram of a data switching system according to an embodiment of the present invention. As shown in FIG. 10, the data switching system mainly includes a first processing apparatus 1010 and a data switching apparatus 1020 described in Embodiment 1 to Embodiment 3. The first processing apparatus 1010 is configured to: determine, according to a predetermined rule, whether a switching manner of a to-be-switched data packet is electrical packet switching or optical packet switching, and generate an optical label for a second optical data packet, where the second optical data packet is a to-be-switched data packet determined to use optical packet switching. The data switching apparatus 1020, connected to the first processing apparatus 1010, is configured to: perform electrical packet switching on a first optical data packet received from the first processing apparatus 1010, and perform optical packet switching on the second optical data packet received from the first processing apparatus 1010, where the first optical data packet is a to-be-switched data packet determined to use electrical packet switching.

In a possible implementation manner, the predetermined rule may be: whether a length of the to-be-switched data packet exceeds a predetermined threshold, and whether a priority of the to-be-switched data packet exceeds a predetermined level. That is, according to length information of the to-be-switched data packet, optical packet switching may be performed on a data packet whose length is greater than the predetermined threshold, electrical packet switching may be performed on a data packet whose length is less than the predetermined threshold; or according to the priority of the to-be-switched data packet, optical packet switching may be performed on a data packet whose priority is greater than the predetermined level, and electrical packet switching may be performed on a data packet whose priority is less than the predetermined level.

According to the data switching system in this embodiment of the present invention, advantages of an electrical packet switching technology and an optical packet switching technology can be fully used, so that the data packet can be rapidly switched to the destination port.

In a possible implementation manner, the first processing apparatus 1010 is further configured to: modulate the optical label and the first optical data packet on light of a first wavelength, and modulate the second optical data packet on light of a second wavelength; and the data switching apparatus described in Embodiment 4 is used as the data switching apparatus 1020, that is, the data switching apparatus 1020 includes a demultiplexing unit based on structures in Embodiment 1 to Embodiment 3.

Figure 11:
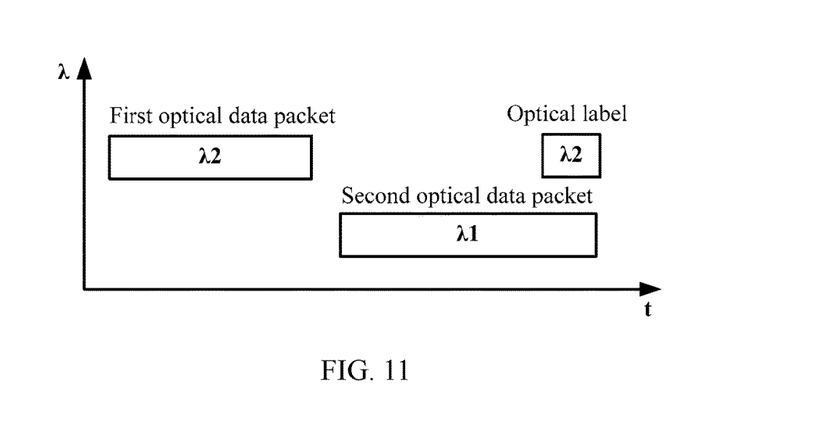
FIG. 11 is a schematic diagram of a time-domain and frequency-domain relationship between a first optical data packet, a second optical data packet, and an optical label that are output after being modulated by a first processing apparatus of the data switching system shown in FIG. 10.

Specifically, as shown in FIG. 11, the first optical data packet and the optical label are modulated on light whose wavelength is λ2 by the first processing apparatus 1010, and the second optical data packet is modulated on light whose wavelength is λ1. Optical signals modulated on light of different wavelengths do not interfere with each other. Therefore, the optical signals can be transmitted in an optical fiber at the same time, and are separated by the demultiplexing unit before optical switching and optical-to-electrical conversion are performed.

In a possible implementation manner, the first processing apparatus 1010 is further configured to perform protocol conversion on the second optical data packet into a particular frame format, so that the second optical data packet can be switched by the optical switching unit of the data switching apparatus.

In a possible implementation manner, the data switching system further includes a second processing apparatus 1030, where the second processing apparatus 1030, connected to the data switching apparatus 1020, is configured to perform protocol conversion on data packets that are output by an electrical-to-optical conversion unit and the optical switching unit into a particular frame format, so that the data packets can be identified by a network device.

Figure 12:
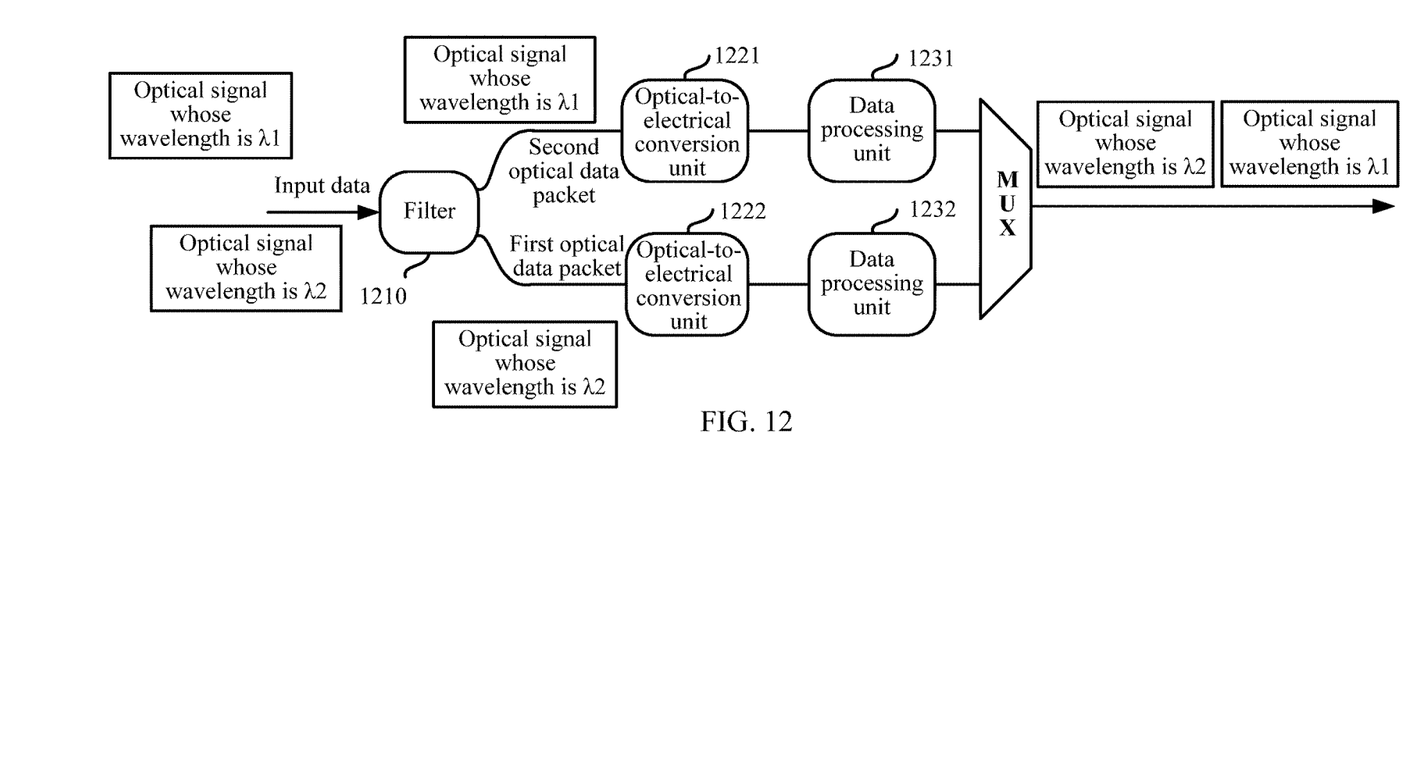
FIG. 12 is a structural block diagram of a second processing apparatus according to an embodiment of the present invention.

In a possible implementation manner, a structural block diagram of the second processing apparatus 1030 may be shown in FIG. 12. After the data packet output by the multiplexing unit passes through a filter 1210, optical signals of different wavelengths are separated, and are respectively output to an optical-to-electrical conversion unit 1221 and an optical-to-electrical conversion unit 1222. After the optical signals are converted into electrical signals, the electrical signals are respectively output to a data processing unit 1231 and a data processing unit 1232. The data processing units restore the electrical signals to data packets of the Ethernet Protocol, and after being aggregated by a multiplexer (MUX) multiplexer, the data packets are output to a network device.

It should be noted that when the apparatus described in Embodiment 1 is used as the data switching apparatus, the second processing apparatus 1030 may not include the filter 1210. The second processing apparatus 1030 includes two physical ports. Data packets output to a same destination port are respectively output to the optical-to-electrical conversion unit 1221 and the optical-to-electrical conversion unit 1222 through the two physical ports. When the apparatus described in Embodiment 3 is used as the data switching apparatus, the second processing apparatus 1030 may not include the filter 1210, and can restore a to-be-switched data packet to a data packet of the Ethernet Protocol and output the data packet to a network device as long as only a pair of optical-to-electrical conversion units and a pair of data processing units are included. In an actual application, a user can completely flexibly select a data switching apparatus described in Embodiment 1 to Embodiment 4, and select a proper second processing apparatus to match the data switching apparatus according to a personal preference and/or an actual application scenario.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data switching apparatus, comprising:
an optical-to-electrical converter, configured to perform optical-to-electrical conversion on a first optical data packet and an optical label, wherein the first optical data packet is a to-be-switched data packet that needs to use electrical packet switching, the optical label carries switching information of a second optical data packet, and the second optical data packet is a to-be-switched data packet that needs to use optical packet switching;
a memory coupled to a processor which is connected to the optical-to-electrical converter, wherein the processor is configured to identify whether an electrical signal output by the optical-to-electrical converter is from the optical label or the first optical data packet, according to a preset sequence same as an optical label delimiter and a preset length of the optical label;
an electrical switch, connected to the processor, configured to switch an electrical signal that is from the first optical data packet;
an electrical-to-optical converter, connected to the electrical switch, configured to perform electrical-to-optical conversion on an electrical signal output by the electrical switch;
wherein the processor is further configured to generate a control signal according to an electrical signal that is from the optical label; and
an optical switch, connected to the processor, configured to output the second optical data packet according to the control signal through an optical link.

2. The data switching apparatus according to claim 1, further comprising a multiplexer, wherein the multiplexer, connected to the electrical-to-optical converter and the optical switch, is configured to multiplex data packets that are output by the electrical-to-optical converter and the optical switch to a same destination port, into one signal.

3. The data switching apparatus according to claim 1, further comprising:
a cache memory, connected to the electrical switch and the electrical-to-optical converter, configured to store the electrical signal output by the electrical switch; and
wherein the processor which is connected to the cache memory, is further configured to: generate a sending control signal according to switching information of the first optical data packet and the switching information of the second optical data packet, and control the cache memory according to the sending control signal.

4. The data switching apparatus according to claim 1, further comprising: a demultiplexer, wherein the demultiplexer, connected to the optical-to-electrical converter and the optical switch, is configured to: separate light of a first wavelength and light of a second wavelength from a received optical signal, output the light of the first wavelength to the optical-to-electrical converter, and output the light of the second wavelength to the optical switch, wherein the first optical data packet and the optical label are modulated on the light of the first wavelength, and the second optical data packet is modulated on the light of the second wavelength.

5. A data switching system, comprising:
a first processor, configured to: determine, according to a predetermined rule, whether a switching manner of a to-be-switched data packet is electrical packet switching or optical packet switching, and generate an optical label for a second optical data packet, wherein the second optical data packet is a to-be-switched data packet determined to use optical packet switching; and
a data switching apparatus, connected to the first processor, configured to: perform electrical packet switching on a first optical data packet received from the first processor, and perform optical packet switching on the second optical data packet received from the first processor, wherein the first optical data packet is a to-be-switched data packet determined to use electrical packet switching; and
wherein the data switching apparatus comprises:
an optical-to-electrical converter, configured to perform optical-to-electrical conversion on a first optical data packet and an optical label, wherein the first optical data packet is a to-be-switched data packet that needs to use electrical packet switching, the optical label carries switching information of a second optical data packet, and the second optical data packet is a to-be-switched data packet that needs to use optical packet switching;
a memory coupled to a processor which is connected to the optical-to-electrical converter, wherein the processor is configured to identify whether an electrical signal output by the optical-to-electrical converter is from the optical label or the first optical data packet, according to a preset sequence same as an optical label delimiter and a preset length of the optical label;
an electrical switch, connected to the processor, configured to switch an electrical signal that is from the first optical data packet;
an electrical-to-optical converter, connected to the electrical switch, configured to perform electrical-to-optical conversion on an electrical signal output by the electrical switch;
wherein the processor is further configured to generate a control signal according to an electrical signal that is from the optical label; and
an optical switch, connected to the processor, configured to output the second optical data packet according to the control signal through an optical link.

6. The data switching system according to claim 5, wherein
the first processor is further configured to: modulate the optical label and the first optical data packet on light of a first wavelength, and modulate the second optical data packet on light of a second wavelength; and
the data switching apparatus further comprises a demultiplexer, wherein the demultiplexer, connected to the optical-to-electrical converter and the optical switch, is configured to: separate the light of the first wavelength and the light of the second wavelength from a received optical signal, output the light of the first wavelength to the optical-to-electrical converter, and output the light of the second wavelength to the optical switch.

7. The data switching system according to claim 5, wherein the first processor is further configured to perform protocol conversion on the second optical data packet into a particular frame format, so that the second optical data packet can be switched by the optical switch of the data switching apparatus.

8. The data switching system according to claim 7, further comprising: a second processor, wherein the second processor, connected to the data switching apparatus, is configured to perform protocol conversion on data packets that are output by the electrical-to-optical converter and the optical switch into a particular frame format, so that the data packets can be identified by a network device.

9. The data switching system according to claim 5, wherein the predetermined rule comprises: whether a length of the to-be-switched data packet exceeds a predetermined threshold, and whether a priority of the to-be-switched data packet exceeds a predetermined level.

* * * * *